United States Patent
Barhudarian et al.

(10) Patent No.: US 11,349,844 B2
(45) Date of Patent: May 31, 2022

(54) INSTANT ENFORCEMENT OF CENTRALLY CONFIGURED IT POLICIES

(71) Applicant: MICROSOFT TECHNOLOGY LICENSING, LLC, Redmond, WA (US)

(72) Inventors: Violet Anna Barhudarian, Kirkland, WA (US); Jiangfeng Lu, Bothell, WA (US); Caleb Geoffrey Baker, Seattle, WA (US); Oren Jordan Melzer, Redmond, WA (US); Anirban Basu, Sammamish, WA (US); Chandra Sekhar Surapaneni, Sammamish, WA (US); Nitika Gupta, Seattle, WA (US); Murli Dharan Satagopan, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 217 days.

(21) Appl. No.: 16/670,563

(22) Filed: Oct. 31, 2019

(65) Prior Publication Data

US 2021/0136076 A1    May 6, 2021

(51) Int. Cl.
*H04L 9/40*    (2022.01)

(52) U.S. Cl.
CPC ............ *H04L 63/102* (2013.01); *H04L 63/08* (2013.01); *H04L 63/20* (2013.01)

(58) Field of Classification Search
CPC ....... G06F 21/604; G06F 21/62; H04L 63/20; H04L 63/08; H04L 63/102; H04L 63/06; H04L 63/108; H04L 63/0846; H04L 63/1425; H04L 63/0815; H04L 63/068; H04L 2463/121

USPC .......................................................... 726/1
See application file for complete search history.

(56) References Cited

U.S. PATENT DOCUMENTS

| | | |
|---|---|---|
| 2004/0260553 A1 | 12/2004 | Niemi |
| 2011/0209196 A1* | 8/2011 | Kennedy ................. G06F 21/60 726/1 |
| 2014/0214503 A1* | 7/2014 | Chircorian ............. H04L 67/02 705/14.4 |
| 2018/0139200 A1 | 5/2018 | Gordon et al. |
| 2019/0318115 A1 | 10/2019 | Holt et al. |

OTHER PUBLICATIONS

Manage access to third-party apps with new G Suite security controls Jul. 6, 2017 Reena Nadkarni (Year: 2017).*
"International Search Report and Written Opinion Issued in PCT Application No. PCT/US20/056954", dated Jan. 25, 2021, 12 Pages.

* cited by examiner

*Primary Examiner* — Benjamin A Kaplan
(74) *Attorney, Agent, or Firm* — Workman Nydegger (57) ABSTRACT

Managing an authenticated user session. A method includes a resource provider computer system subscribing to a conditional access termination service for an entity configured to obtain resources from the resource provider computer system through a user session. The resource provider computer system receives an event, related to resource requests, for the entity from the conditional access termination service. The resource provider computer system receives a request for resources from the entity. The resource provider computer system evaluates the request with respect to the event. The resource provider computer system responds to the request based on evaluating the request with respect to the event.

20 Claims, 5 Drawing Sheets

Subscribe To A Conditional Access Termination Service For An Entity Configured To Obtain Resources From The Resource Provider Computer System Through A User Session Receive An Event, Related To Resource Requests, For The Entity From The Conditional Access Termination Service

Receive A Request For Resources From The Entity

Evaluate The Request With Respect To The Event

Respond To The Request Based On Evaluating The Request With Respect To The Event.

INSTANT ENFORCEMENT OF CENTRALLY CONFIGURED IT POLICIES

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing system's ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems. For example, an entity may be configured to access resources from a resource provider where the resource provider is a remote computing system. To obtain access to these resources, the entity will typically authenticate with an identity provider to receive an access token and a refresh token, where the access token can be presented to the resource provider in a request for resources. If the access token is valid, an authenticated session is created between the resource provider and the entity to provide the resources.

In particular, IT Administrative policies for an organization are often configured centrally on the identity provider used by the organization. The policies are then enforced by the identity provider when issuing authentication artifacts (e.g., access tokens) that are used to confirm a user's identity. Before issuing an access token to the user, the identity provider evaluates administrative policies to ensure the user's compliance. If the user complies with the policies, the access token is issued to the user. The access token is then passed to a resource provider that grants resource access based on the information in the access token. After the access token is issued and until it reaches its expiration the identity provider has no means to update resource providers on changes in the user's security state. For example, if the user's employment has been terminated, the user will continue to have access to the resources until the user's access tokens expire.

For example, access tokens will often be issued by an identity provider where the access tokens are valid for one hour. Thus, there could be a one-hour time frame when an entity should not have access to resources at a resource provider when the entity could obtain access to the resources.

Some solutions to this have been to reduce the access token validity time. However, this only shortens the length of time which an unauthorized entity can have access to resources. Additionally, this has the negative drawback of resulting in dramatically increased network traffic. For example, if the validity period were reduced to 10 minutes instead of one hour, there would be a corresponding 600% increase in network traffic for authentication between the aunt entity and the identity provider.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that includes acts for managing an authenticated user session. The method includes a resource provider computer system subscribing to a conditional access termination service for an entity configured to obtain resources from the resource provider computer system through a user session. The resource provider computer system receives an event, related to resource requests, for the entity from the conditional access termination service. The resource provider computer system receives a request for resources from the entity. The resource provider computer system evaluates the request with respect to the event. The resource provider computer system responds to the request based on evaluating the request with respect to the event.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments illustrated herein are able to implement so called 'instant enforcement' of IT Policies. That is, there exists a technical problem whereby systems are vulnerable to unauthorized access due to unauthorized entities using unexpired access tokens to access resources to which they should no longer have access. Further, there exists a technical problem of increased traffic when systems attempt to shorten access token validity times. Typically it is not feasible to configure resource providers to enforce policy as doing so affects the scalability of enterprise systems. In particular, it is expensive in terms of computational resources and administrator resources to reconfigure resource providers any time there is a policy change or any time there is a change that would necessitate revoking a user session. As the number of resource providers increases in such systems, cost in terms of computational resources and administrator resources increases proportionally. Thus, a system that requires each resource provider computer system to be reconfigured would necessarily need to be limited in the number of resource provider computer systems that could be implemented. Further, requiring each resource provider to be reconfigured would require a system that was able to track and manage all resource providers in a fashion that allowed them to be reconfigured. Further, requiring each resource provider to be reconfigured could actually take more time than simply allowing a token to expire, thus negating any benefit achieved by reconfiguring the resource provider computer systems. Thus, there is a need for systems which allow for highly scalable numbers of resource providers to be added to the enterprise system while still being able to address the need to invalidate unexpired tokens. This can be particularly important in cloud-based systems where resource providers can be quickly added, except when external constraints such as those illustrated above are placed on the systems.

Embodiments illustrated herein can implement a technical solution which instantly (or at least very quickly) notifies resource providers of potential access issues by an entity to the resources. This is implemented in some embodiments by the technical means of a conditional access termination service. In particular, the technical means includes allowing a resource provider to receive events relevant to entities that attempt to receive resources from the resource provider. In some embodiments, this can occur as a result of the resource providers subscribing to the conditional access termination service to receive events. The events can be evaluated at the resource provider against requests for resources to determine actions that should be taken with respect to the requests for resources from the entities. This allows for policy related information to be provided to resource providers in a fashion that still allows for a scalable system with respect to the resource providers. In particular, there is no need to track and reconfigure individual servers, rather each of the resource providers can subscribe to receive events according to policy considerations in those events.

For example, embodiments may include a system that can communicate policy signals to resource providers who can then make decisions on revoking existing sessions and redirecting users back to identity provider for policy re-evaluation.

For example, some embodiments can detect changes that affect security of a user's account. These changes can include but are not limited to:
1. account state changes: credential change, account disabled or deleted, policy or group membership changes, increases in account risk, etc.
2. device state changes: device falls out of compliance, has virus, etc.
3. session state changes: session revoked, increase in session risk, etc.

On detection of such changes, the conditional access termination service (which in some embodiments may be included as part of the identity provider) will publish events to the subscribers. Interested resource providers will subscribe to the events. On receiving events for the user resource providers will revoke the existing session for the users and redirect the user back to the identity provider.

In some cases, resource providers need to redirect on a condition: for example, if a user's device has virus on it, only sessions initiated from the infected device should be affected. Thus, a condition included in an event may be a device-based condition. If an entity requests resources using a device indicated in an event to the resource provider, the entity will be redirected to an identity provider. In some embodiments, the identity provider will re-evaluate the user's policy and will either re-issue an access token after re-validating user's identity, display remediation steps to the user (e.g. remove the virus from the device) or block the user entirely.

Figure 1:
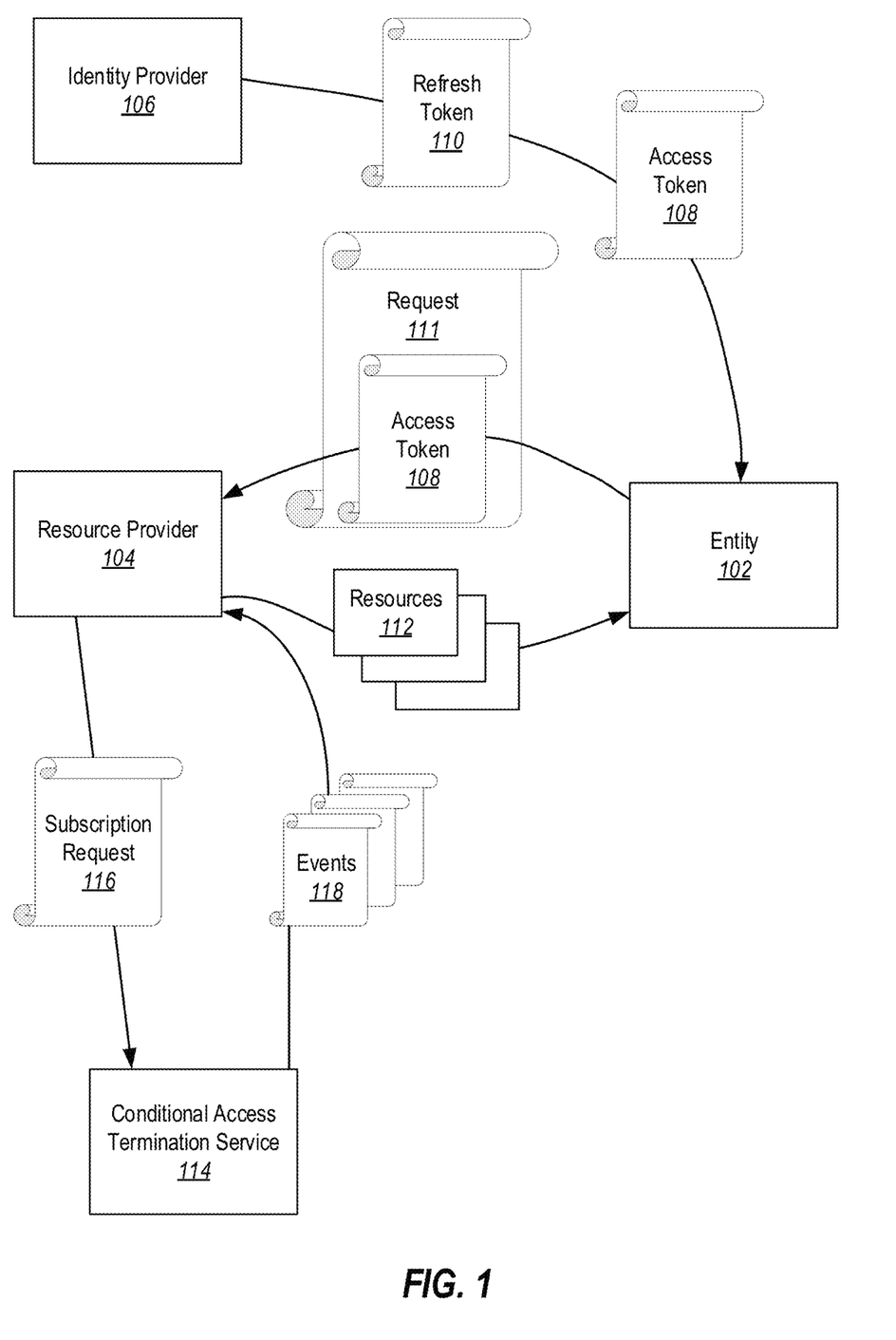
FIG. 1 illustrates interaction of various computer systems to implement an event driven enforcement of IT policies.

Referring now to FIG. 1, an example is illustrated. FIG. 1 illustrates an entity 102. In the illustrated example, the entity 102 may include a user as well as the device and associated clients used by the user. The entity 102 may have need to access resources from a resource provider 104. To obtain access to the resources, the entity will first authenticate with an identity provider 106. The entity 102 can authenticate to the identity provider 106 through any one of a number of different well-known authentication and access token issuance schemes, other less well-known authentication schemes, or even future authentication schemes yet to be developed. Suffice it to say, in the particular example shown in FIG. 1, the entity 102 receives from the identity provider 106 an access token 108 and a refresh token 110.

The access token 108 typically includes a timestamp indicating when the access token was issued. The access token 108 may alternatively or additionally include information indicating when the access token 108 expires. In some embodiments, the access token 108 may include information about authentication procedures used by the entity 102 to authenticate to the identity provider 106. For example, the access token 108 may indicate that the access token 108 was obtained by the entity 102 authenticating to the identity provider using a simple user identity and secret authentication protocol. One such common protocol is the password authentication protocol, where the identity is a username and the secret is a password. Alternatively or additionally, if the entity 102 is authenticated to the identity provider 106 using double factor authentication, this can be indicated in the access token 108. Alternatively or additionally, if the entity 102 is authenticated to the identity provider using a certain strength of password, this sort of information can be indicated in the access token 108 itself. For example, the access token may indicate the minimum length of password used to authenticate to the identity provider, use of special characters in the password used to authenticate to the identity provider, use of both upper and lowercase letters in the password used to authenticate to the identity provider, absence of common passwords or other words in the password used to authenticate to the identity provider, etc.

In some embodiments, the access token 108 will be for a particular user as well as for a client used by the particular user. Thus, in this example, the entity 102 includes both the user and the client used by the user. For example, the user may use a laptop computer with a corresponding laptop computer client to perform the authentication and resource requests. Thus, the access token 108 may include information about the laptop computer client of the entity 102.

Alternatively, the user may use a smart phone to perform the authentication, in which case a corresponding smart phone client is used to perform the authentication and to perform resource requests, meaning that the access token 108 will be for an entity 102 including a user using a smart phone client. As will be illustrated in more detail below, this additional information can be used by the resource provider 104 to evaluate certain conditions indicated in events provided by a conditional access termination service.

Returning once again to the example illustrated in FIG. 1, the entity 102 can provide the access token 108 to the resource provider 104 in a request for resources from the resource provider 104. The resource provider 104 can evaluate the access token to determine that the entity 102 has been properly authenticated to the identity provider 106 and that the access token 108 is otherwise valid. In particular, the access token 108 may have an expiration and the resource provider 104 can determine that the access token 108 has not expired. Ordinarily, so long as this evaluation of the access token 108 passes the various checks, then the resources 112 will be provided to the entity 102. However, embodiments illustrated herein can implement additional checks with respect to the request 111 by the entity 102 to the resource provider 104.

In particular, FIG. 1 illustrates that the resource provider 104 can subscribe to a conditional access termination service 114. In some embodiments, the conditional access termination service 114 may be included in the identity provider 106. For example, embodiments may be implemented where policy is configured and administered at the same central location. Thus, embodiments may include an identity provider 106 that includes as part of the identity provider 106 the conditional access termination service 114.

In alternative embodiments, the conditional access termination service 114 may be implemented independent of the identity provider 106. For example, embodiments may still be able to implement a centralized conditional access termination service but that is separate from the identity provider 106. In some embodiments, the conditional access termination service 114 may be associated with a policy server including both set policies and the ability to enforce the set policies. In the example illustrated, the resource provider 104 sends a subscription request 116 to the conditional access termination service 114. The resource provider subscribes to events related to the entity 102. As illustrated in FIG. 1, events 118 can be published from the conditional access termination service 114 to the resource provider 104 regarding the entity 102.

As discussed previously, events may be triggered due to account state changes, device state changes, client state changes, session state changes, etc. For example, a policy service can detect changes related to policy at the policy service.

Typically, an event will include one or more of the following: entity information, condition, timestamp, or action.

Entity information included in an event may include information identifying a particular user of an entity 102, device information for the entity 102, client information for the entity 102, user role information for the entity 102 (e.g., is the user acting as an administrator, or other special authoritative user), membership information for the entity 102, etc.

Condition information included in an event may include one or more conditions that should be evaluated to determine if a particular action should be taken.

A timestamp included in an event may indicate a time when the event was issued (or some other significant time). Alternatively or additionally, an event may include a timestamp identifying a time that should be conditionally evaluated.

An action included in an event indicates an action that should be taken with respect to the event. Notably, in some embodiments, actions are conditional meaning that certain actions should only be taken only when certain conditions are met.

Various examples are now illustrated.

As discussed above, in some embodiments events 118 may be issued from the conditional access termination service 114 to the resource provider 104 based on device state changes. In particular, the conditional access termination service 114 may be informed of changes to the device of the entity 102. This can be facilitated by the entity 102 being registered with a particular administrative service, periodic messages by the entity 102, general knowledge that devices of the type employed by the entity 102 have been changed generally, or in other ways. Thus, it should be noted that the conditional access termination service 114 may be connected by various interconnections to other systems that can provide information about the device state changes of the entity 102 such that appropriate events 118 can be issued.

The following illustrates a particular scenario illustrating one example of a device state change. In this example, an administrator has configured a policy to require a compliant (in that it complies with system policy) and healthy (in that it is functioning within some predefined functional standards) device as a condition for data access. The identity provider 106 extends ability to correlate app session with the device ID to resource providers. The conditional access termination service 114, which in this case is a policy server, learns that a device for the user has fallen out of compliance, has a virus, or has otherwise failed to meet policy. The policy server publishes events 118 to the subscribers (e.g., the resource provider 104) for this user as a result. The event contains a conditional action that the subscribers need to perform to comply with the policy. The condition, in this example, is a Device ID for an out of compliant device.

As discussed above, in some embodiments events 118 may be issued from the conditional access termination service 114 to the resource provider 104 based on a change to a client application. In particular, a change to a client application can be detected by a policy server, such as the conditional access termination 114, and one or more events can be sent to resource providers, such as resource provider 104, as a result. Such changes to the client application may include updates to the client application (e.g., new versions), configuration changes to the client application, revocation by an administrator, etc.

The following illustrates a detailed example of a client application change scenario. In this scenario, an administrator has removed a certain client application from the list of trusted apps for a tenant (where in this example, the tenant is the entity 102). A policy server (such as a policy server implemented as or with the conditional access termination service 114) publishes one or more events 118 to the subscribers (e.g., the resource provider 104) for this entity 102. At least one of the events 118 contains the action that the subscribers need to perform to comply with the policy and the client ID for the removed application.

As discussed above, in some embodiments events 118 may be issued from the conditional access termination service 114 to the resource provider 104 based on user state changes. For example, such changes may be based on changes to user attributes. For example, one or more events 118 may be emitted if a password is reset or changed. Alternatively or additionally, one or more events 118 may be emitted if a user account is disabled or deleted. Alternatively or additionally, one or more events 118 may be emitted if a compromised user is detected, etc.

As discussed above, in some embodiments events 118 may be issued from the conditional access termination service 114 to the resource provider 104 based on session state changes. For example, an administrator may revoke a user session. Alternatively or additionally, a policy server may detect an increase in a session's risk level. Such increased risk may be detected, for example, as a result of detecting that a device is on a certain network, located in a certain location, unusual input is being input at a device, or simply that risk conditions have generally increased, or based on other detected occurrences.

As discussed above, in some embodiments events 118 may be issued from the conditional access termination service 114 to the resource provider 104 based on policy state changes. For example, an administrator may change memberships or roles for a user, resulting in one or more events 118 being issued.

When events are to be issued (as illustrated in the examples above, or for other reasons), a policy server (such as is illustrated by the conditional access termination service 114) publishes one or more events 118 to the subscribers (e.g., resource provider 104) for this user. Note that while a single resource provider subscriber is illustrated in FIG. 1, it should be appreciated that multiple subscribers can subscribe to relevant events for a particular entity. Note that event can be emitted by the subscription publication service in a selective fashion to multiple subscribes. That is, in some embodiments, subscribers will only receive events relevant to them. Thus, some events will be sent to all subscribers for an entity, while other events will be sent only to relevant subscribers. In other embodiments, all events are sent to all subscribers for an entity, and the burden for determining if an event is relevant for a resource provider is pushed to the resource provider.

The events 118 contains the action(s) that the subscribers need to perform to comply with a particular policy. For example, an action specified in an event may include revoking the session and redirecting the user back to the identity provider 106. Alternatively or additionally, an action specified in an event may include blocking access to certain resources (or types of resources) or providing limited access (e.g., read only) to certain resources (or types of resources). Alternatively or additionally, conditions may be included in the event, such that the action included in the event may include revoking the session and redirecting the user back to the identity provider 106 if a condition is met, etc.

In some embodiments, the events 118 contain timestamps. In some embodiments, a condition, either included in an event itself or implemented on all events due to programmatic event handing protocols, causes the action in the events 118 to be performed only if the access token was issued prior to a particular event being evaluated. For example, in one embodiment, the resource provider 104 compares the timestamps in one or more the events 118 with when the access token 108 was issued and applies the actions in the events 118 only if the access token was issued prior to the timestamps in the events.

On redirection the identity provider 106 can perform various actions depending on the policy setting, such as displaying a suitable message to the user, prompting the user for stronger authorization, issuing a new access token to the user with the 'limited access' claim that can be used by resource provider 104 to restrict access to sensitive data, or combinations thereof.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
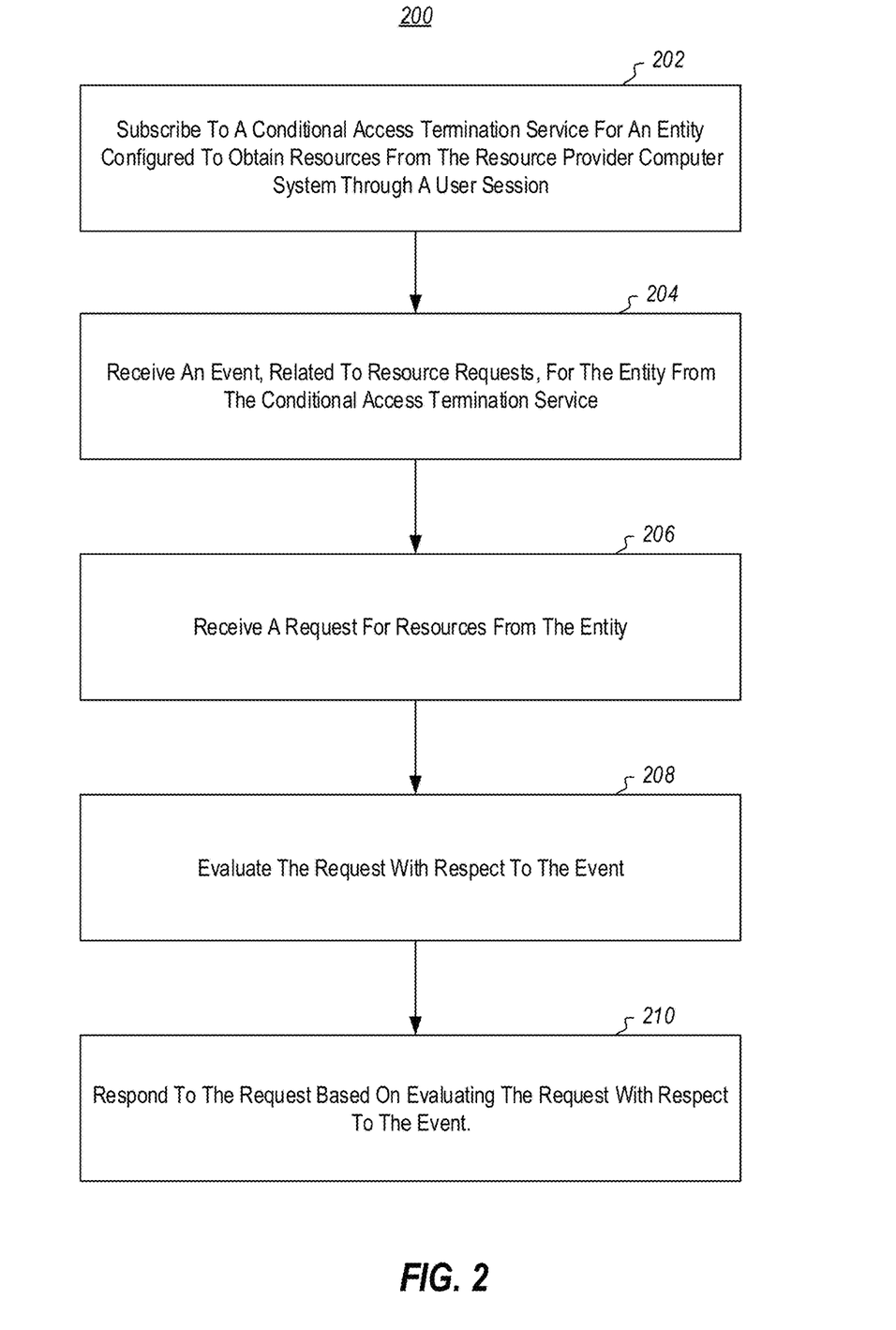
FIG. 2 illustrates a method of managing an authenticated user session.

Referring now to FIG. 2, a method 200 is illustrated. The method 200 includes acts for managing an authenticated user session. The method includes a resource provider computer system subscribing to a conditional access termination service for an entity configured to obtain resources from the resource provider through a user session (act 202). For example, FIG. 1 illustrate the resource provider 104 subscribing to the conditional access termination service 114.

The resource provider computer system receives an event for the entity from the conditional access termination service (act 204). For example, FIG. 1 illustrates the events 118.

The resource provider computer system receives a request for resources from the entity (act 206). For example, FIG. 1 illustrates the request 111 which includes, or is at least associated with the access token 108.

The resource provider computer system evaluates the request with respect to the event (act 208).

The resource provider computer system responds to the request based on evaluating the request with respect to the event (act 210).

The method 200 may be practiced where the event comprises at least one of user information, a condition, a timestamp, or an action.

The method 200 may be practiced where the event comprises an action indicating an action that should be performed by the resource provider with respect to the entity. For example, such actions may include revoking the user session and redirecting the entity to an identity provider for reauthentication. Alternatively, the action may include limiting the entity's access to resources. For example, the resource provider may be directed to block access to all files, block access to certain files, only allow only certain files, etc.

In some embodiments, the event identifies one or more conditions to be evaluated for the resource provider computer system to perform an action. For example, the one or more conditions may be based on an authentication level. For example, an event may indicate that an action should occur if an access token is presented with a certain authentication level, or not having a certain authentication level. For example, the event may specify that if the entity presents an access token obtained using a simple identity and secret authentication procedure, then the user session should be revoked and the entity should be redirected to an identity provider to reauthenticate. Alternatively or additionally, the event may indicate any authentication procedure used to obtain the access token other than (or less secure than) double factor authentication should cause the resource provider to revoke the user session and redirect the entity to the identity provider to reauthenticate. Similar conditions can be indicated for length of password, reuse of passwords, or for other reasons.

Alternatively or additionally, the one or more conditions may be based on a timestamp. For example, in one embodiment, the resource provider compares the timestamps in one or more the events with when the access token was issued and applies the actions in the events only if the access token was issued prior to the timestamps in the events. This allows for policy to be implemented at an identity provider at a particular time where access tokens issued after the particular time will not need to be refreshed as a result of an event.

Alternatively or additionally, the one or more conditions may be based on a client used by the entity. For example, if a policy server determines that a user's desktop client has been compromised, the condition may specify that if a token is for a desktop client, then the action should be taken. However, if the user uses a token for a mobile client, the action will not be taken. In some embodiments, the event may specify a specific device ID, which can be used as a condition for evaluation.

Figure 3A:
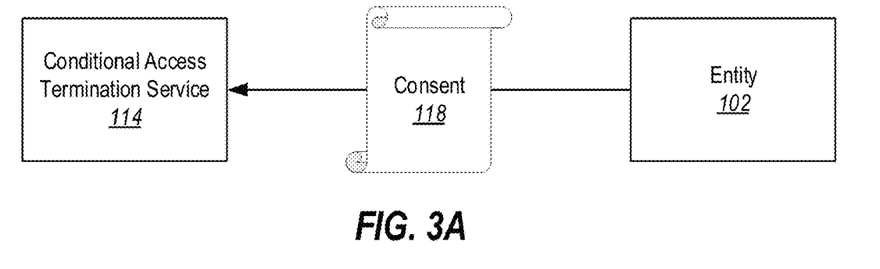
FIGS. 3A, 3B, 3C, and 3D illustrate various modalities for providing consent for a resource provider to subscribe to a conditional access termination service for an entity.

The method 200 may be practiced where the resource provider subscribing to the conditional access termination service for the entity is performed based on the entity consenting to the resource provider subscribing to the conditional access termination service for the entity. As illustrated in FIG. 3A, in some embodiments consent may be provided directly by the entity 102 providing consent 118 directly to the conditional access termination service 114. For example, the entity 118 could send a message to the conditional access termination service 114 indicating which service providers have consent to subscribe to the conditional access termination service 114 with respect to the entity 102.

Figure 3B:
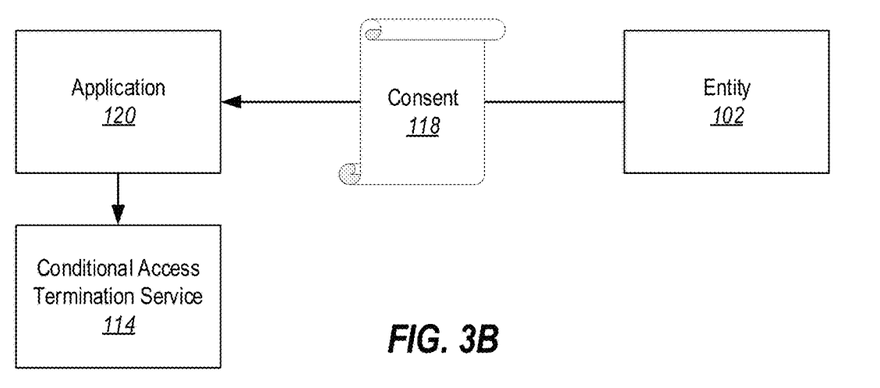

Alternatively or additionally, As illustrated in FIG. 3B, the entity may provide consent 118 to an application 120, and the application 120 may notify the conditional access termination service 114 that the consent is provided. For example, in some embodiments, the application 120 may include a user interface that allows a user to provide the consent as part of the configuration of the application 120.

Figure 3C:
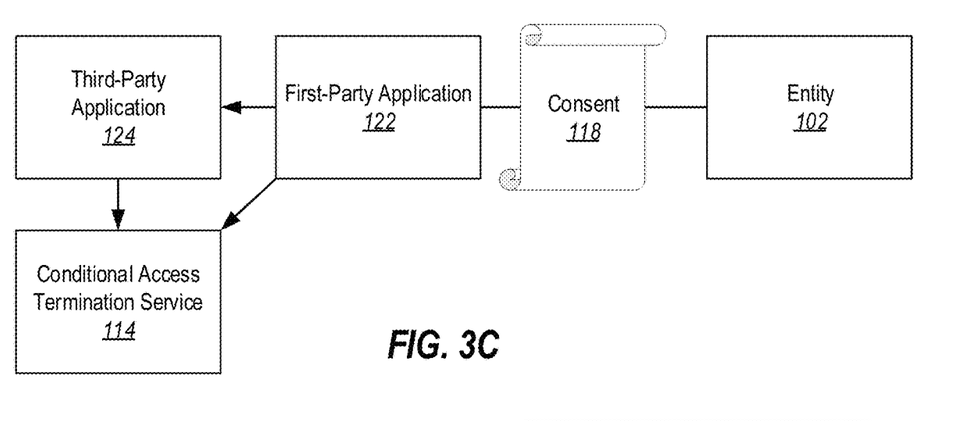

Alternatively or additionally, as illustrated in FIG. 3C, the consent 118 may be provided by the entity 102 consenting to a first-party application 122 for a different third-party application 124. For example, a user may use their Contoso (a fictional company used for illustration herein) credentials, in a single sign-on scenario, which can be used to authenticate to a third-party application not directly controlled by Contoso. The entity will consent to a first-party Contoso application for the third-party application, thus allowing subscriptions for the entity for the third-party application. For example, FIG. 3C illustrates that the consent 118 can be provided to the first-party application 122. The first-party application can notify the third-party application 124 of the consent (which can then notify the conditional access termination service 114 of the consent 118) or can notify the conditional access termination service 114 directly of the consent 118.

Figure 3D:
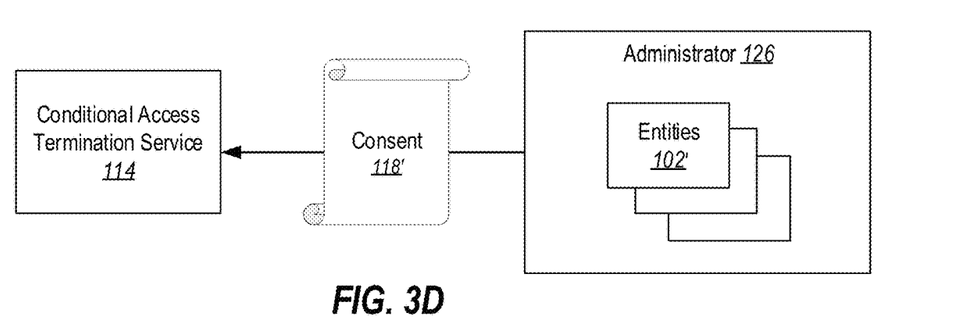

In some embodiments, as illustrated in FIG. 3D, consent may be provided by an administrator for a group of entities including the entity. In the example illustrated in FIG. 3D, the administrator 126 provides consent 118' to the conditional access termination service 114 on behalf of a set 102' of entities over which the administrator has control. While the example illustrated in FIG. 3D shows consent provided directly to the conditional access termination service 114, it should be appreciated that in other embodiments, the consent may be provided to applications such as is illustrated in FIGS. 3B and 3C, or other entities.

Figure 4:
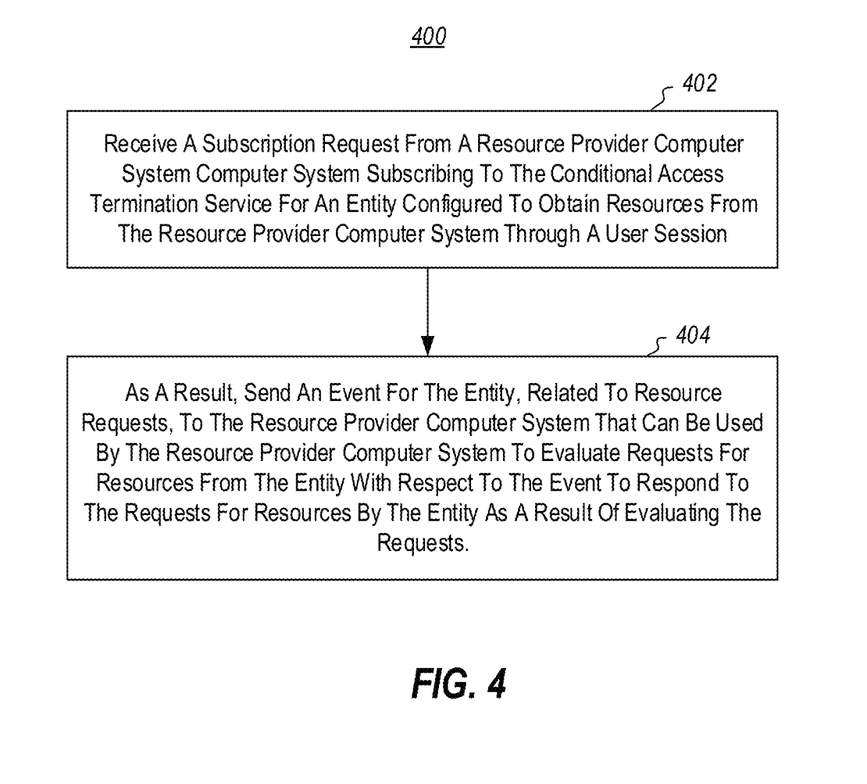
FIG. 4 illustrates a method of managing an authenticated user session.

Referring now to FIG. 4 method of managing an authenticated user session is illustrated. The method includes, at a conditional access termination service, receiving a subscription request from a resource provider computer system computer system subscribing to the conditional access termination service for an entity configured to obtain resources from the resource provider computer system through a user session (act 402).

The method 400 further includes, as a result, sending an event for the entity, related to resource requests, to the resource provider computer system that can be used by the resource provider computer system to evaluate requests for resources from the entity with respect to the event to respond to the requests for resources by the entity as a result of evaluating the requests (act 404).

The method 400 may be practiced where the event comprises at least one of user information, a condition, a timestamp, or an action.

The method 400 may be practiced where the event comprises an action indicating an action that should be performed by the resource provider computer system with respect to the entity. For example, the action may include revoking the user session and redirecting the entity to an identity provider for reauthentication. Alternatively or additionally, the action may include limiting the entity's access to resources.

The method 400 may be practiced where the event identifies one or more conditions to be evaluated for the resource provider computer system to perform the action. In some embodiments, the one or more conditions may be based on an authentication level. Alternatively or additionally, the one or more conditions may be based on a timestamp. the one or more conditions may be based on a client used by the entity.

The method 400 may further include the conditional access termination service permitting subscriptions based on consent being provided for the entity for the resource provider to subscribe to the conditional access termination service for the entity. In some embodiments, consent is provided by an administrator for a group of entities including the entity.

Figure 5:
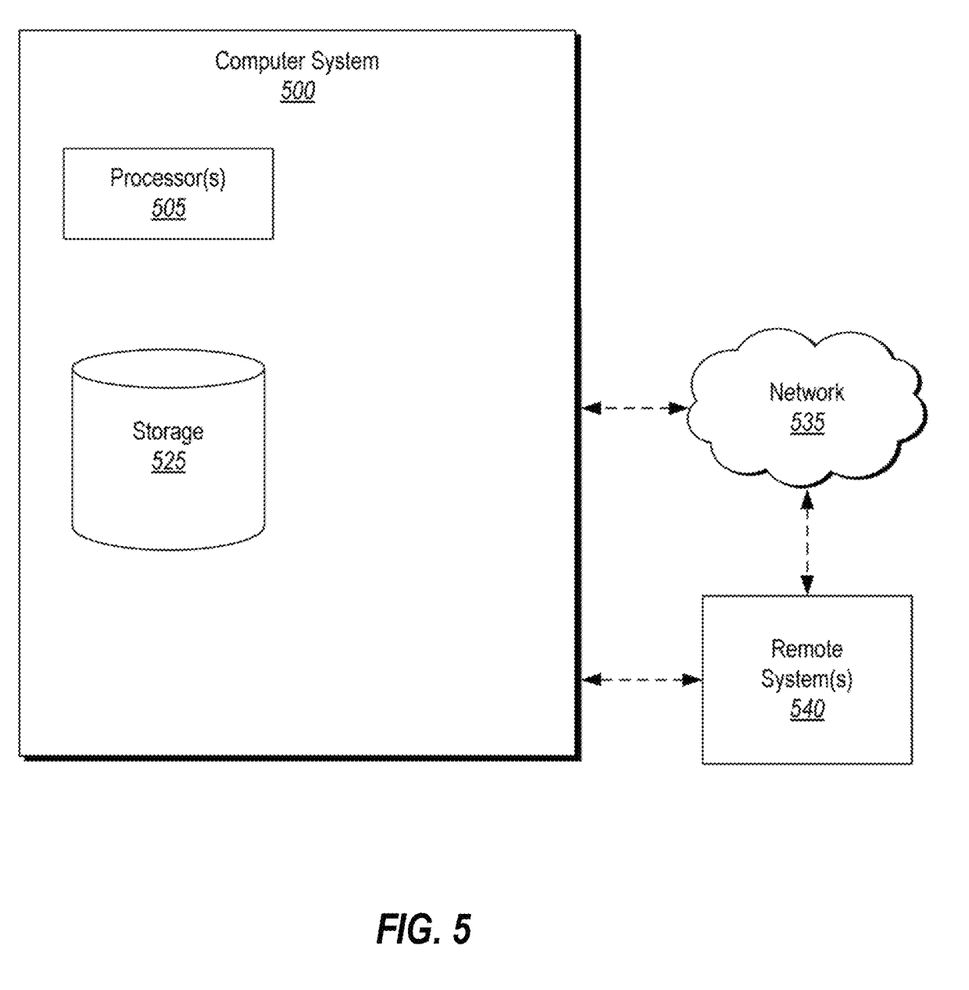
FIG. 5 illustrates a computing system where embodiments may be practiced.

Having just described the various features and functionalities of some of the disclosed embodiments, attention is now directed to FIG. 5, which illustrates an example computer system 500 that may be used to facilitate the operations described herein. Computer systems, such as system 500 may be used to implement any of the computer systems described above.

The methods may be practiced by a computer system 500 including one or more processors 505 and computer-readable storage 525 such as computer memory. In particular, the computer memory may store computer-executable instructions that when executed by one or more processors 505 cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media, such as the storage 525, for carrying or storing computer-executable instructions, data structures, or combinations thereof. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" (e.g., network 535) is defined as one or more data links that enable the transport of electronic data between computer systems, modules, other electronic devices, or combinations thereof. When information is transferred or provided over a network or another communications connection (either hardwired, wireless, or a combination of hardwired or wireless) to a computer (e.g., remote system 540), the computer properly views the connection as a transmission medium. Transmissions media can include a network, or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM, to less volatile computer-readable physical storage media at a computer system, or combinations thereof. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features, methodological acts, or combinations thereof, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of managing an authenticated user session at a conditional access termination service, the method comprising:
    receiving a subscription request from a resource provider computer system subscribing to one or more events associated with user sessions;
    in response to a first authentication of an entity at an identity provider, establishing a user session allowing an entity to access the resource provider computer system,
    determining that at least one of the one or more events occurs during the user session; and
    as a result, sending the at least one of the one or more events to the resource provider computer system, causing the resource provider computer system to revoke the user session and redirect the entity back to the identity provider for a second authentication.

2. The method of claim 1, wherein the event comprises at least one of user information, a condition, a timestamp, or an action.

3. The method of claim 1, wherein the event comprises an action indicating an action that should be performed by the resource provider computer system with respect to the entity, the action comprising at least one of revoking the user session and redirecting the entity to an identity provider for reauthentication or limiting the entity's access to resources.

4. The method of claim 3, wherein the event identifies one or more conditions to be evaluated for the resource provider computer system to perform the action, the one or more conditions being based on at least one of an authentication level, a timestamp, or a client used by the entity.

5. The method of claim 1, further comprising the conditional access termination service permitting subscriptions based on consent being provided for the entity for the resource provider to subscribe to the conditional access termination service for the entity.

6. The method of claim 5, wherein the consent is consent provided by an administrator for a group of entities including the entity.

7. A method of managing an authenticated user session at a resource provider computer system, the method comprising:
    subscribing to one or more events associated with user sessions from a conditional access termination service;
    in response to a first authentication of an entity at an identity provider,
        establishing a user session allowing the entity to access resources provided by the resource provider computer system;

in response to determining that at least one of the one or more events occurs during the user session,
receiving the at least one of the one or more events, from the conditional access termination service;
revoking the user session; and
redirecting the entity back to the identity provider for a second authentication.

8. The method of claim 7, wherein the event comprises at least one of user information, a condition, a timestamp, or an action.

9. The method of claim 7, wherein the event comprises an action indicating an action that should be performed by the resource provider computer system with respect to the entity.

10. The method of claim 9, wherein the action comprises revoking the user session and redirecting the entity to an identity provider for reauthentication.

11. The method of claim 9, wherein the action comprises limiting the entity's access to resources.

12. The method of claim 9, wherein the event identifies one or more conditions to be evaluated for the resource provider computer system to perform the action.

13. The method of claim 12, wherein the one or more conditions are based on an authentication level.

14. The method of claim 12, wherein the one or more conditions are based on a timestamp.

15. The method of claim 12, wherein the one or more conditions are based on a client used by the entity.

16. The method of claim 7, wherein the resource provider computer system subscribing to the conditional access termination service for the entity is performed based on consent having previously been provided for the entity for the resource provider to subscribe to the conditional access termination service for the entity.

17. The method of claim 16, wherein the consent is consent that was provided by an administrator for a group of entities including the entity.

18. The method of claim 16, wherein the consent is consent that was provided by the entity consenting to a first-party application for a third-party application.

19. A computer system comprising:
an identity provider configured to authenticate entities for accessing resources provided by a resource provider computer system; and
a conditional access termination service configured to provide events to resource provider computer systems that subscribe to one or more events associated with user sessions;
wherein the conditional access termination service is configured to:
detect one or more events associated with user sessions established between authenticated entities and the resource provider computer system; and
in response to detecting at least one of the one or more events during one of the user sessions of a particular entity, send the at least one of the one or more events to the resource provider, causing the resource provider computer system to revoke the user session and redirect the entity back to the identity provider for a second authentication;
wherein the identity provider is configured to:
in response to revoking the user session,
receive an authentication request redirected from the resource provider computer system; and
authenticate the particular entity again to establish a second user session between the particular entity and the resource provider.

20. The computer system of claim 19, wherein the event comprises at least one of user information, a condition, a timestamp, or an action.

* * * * *